United States Patent [19]

Utsumi

[11] 4,105,306
[45] Aug. 8, 1978

[54] SOUND MOVIE PROJECTOR

[75] Inventor: Jihaciro Utsumi, Yokohama, Japan

[73] Assignee: Bell Ko-On Co., Ltd., Tokyo, Japan

[21] Appl. No.: 571,064

[22] Filed: Apr. 24, 1975

[51] Int. Cl.² .............................................. G03B 31/02
[52] U.S. Cl. ......................................... 352/14; 352/27
[58] Field of Search ..................... 352/14, 27, 29, 194

[56] References Cited

U.S. PATENT DOCUMENTS

| | | | |
|---|---|---|---|
| 2,190,658 | 2/1940 | Githens | 352/194 |
| 2,243,112 | 5/1941 | Morrissey | 352/14 |
| 2,676,023 | 4/1954 | Isom | 352/27 |
| 3,244,469 | 4/1966 | Hennessey | 352/14 |
| 3,597,056 | 8/1971 | Sasaki | 352/14 |

*Primary Examiner*—Monroe H. Hayes

*Attorney, Agent, or Firm*—Oblon, Fisher, Spivak, McClelland & Maier

[57] ABSTRACT

A sound movie projector includes, in a serial manner, a first sprocket, an intermittent film advance mechanism for advancing the film on a frame-by-frame basis past a projection gate, a sound recording and/or reproducing head assembly, a film drive roller assembly, and a second sprocket. The difference in film feeding speed at the projection gate and the sound reproducing station is detected by monitoring the length of the film disposed between the film drive roller assembly and the second sprocket by means of a pivotable sensing lever operatively engaged with a portion of the film having a substantially rectiliner configuration under normal conditions, and as a result of such monitoring, the film feeding speed at the film projection gate is appropriately adjusted in a continuous manner utilizing a cone pulley drive system.

9 Claims, 1 Drawing Figure

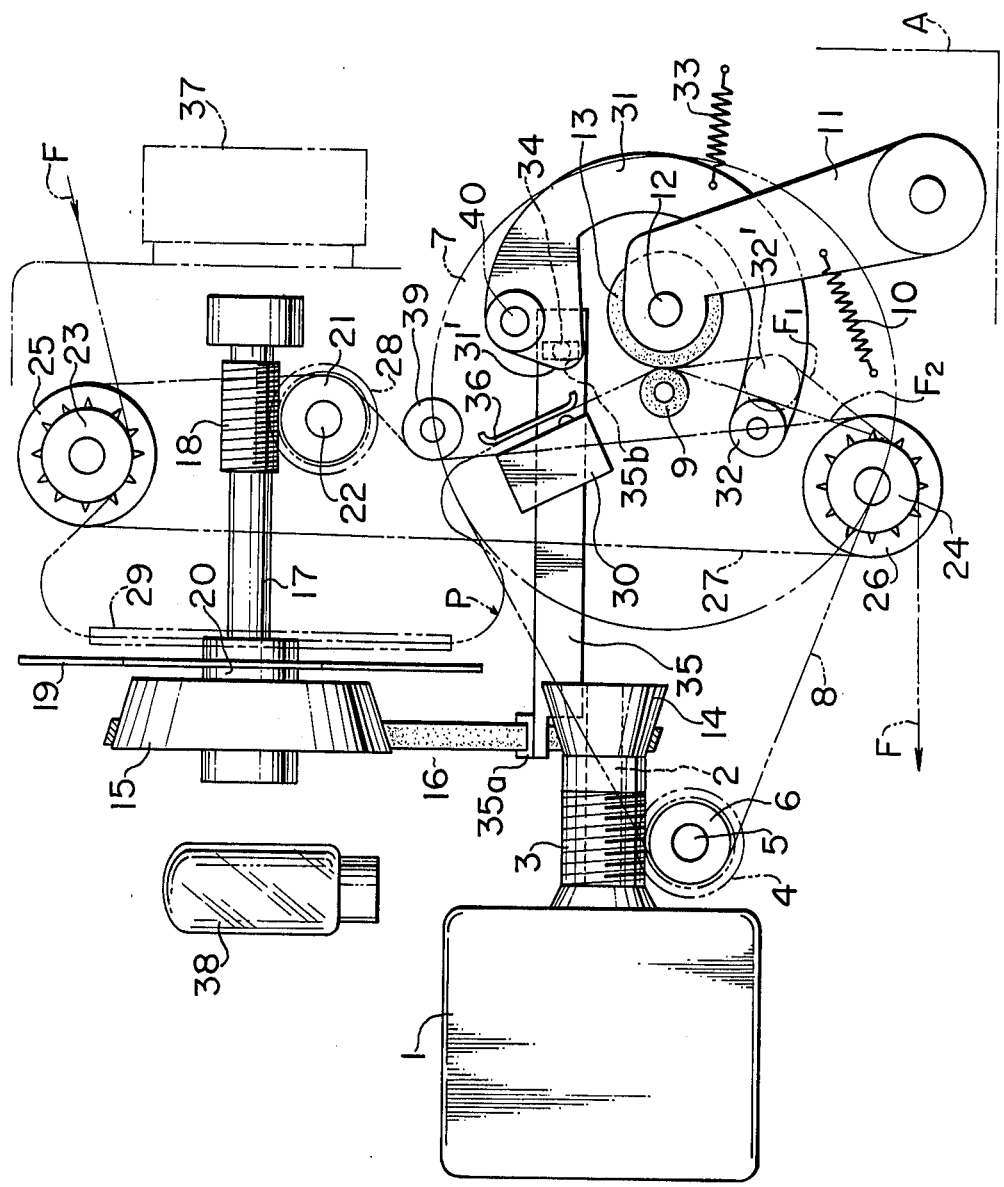

SOUND MOVIE PROJECTOR

This invention relates to sound movie projectors, and more particularly to the projectors which can maintain image reproduction and sound record and/or reproduction in a predetermined mutual position with a simple mechanical construction and which can synchronize them automatically.

In the novel 8mm sound film system such as Kodak Movie System, it is essentially necessary to maintain the film length between the image reproduction and sound reproduction stations strictly within a specified length for the sound movie projector. According to this kind of projector, the film must be fed intermittently at a projection gate, while it must be fed continuously at the sound recording and reproducing head. For this, it has been proposed and used to advance the film, which is threaded from the film supply reel, through a first sprocket, and to then pass the film intermittently at the projection gate so as to be smoothed with a large scale flywheel, which is called the impedance roller system. According to this system, a roller is provided, to which the film is pressed by another roller provided upon the opposite side of the film, and the film is pulled initially by a second sprocket whereby the flywheel is then continuously rotated, thus avoiding wow and flutter. Since the initiating energy of the flywheel is transmitted to the roller provided coaxially with the flywheel from the second sprocket through the tension of the film, the small-sized roller of the flywheel will cause an excess load to be placed upon the second sprocket when it initially extracts the film, and thus the film will be excessively tensioned which might destroy the film perforations. On the other hand, if a rather large diameter roller is used, the load on the second sprocket at the initiation of operation can be lightened accordingly. However, in such case, the rotation of the roller per unit of time will be smaller and thus a larger flywheel becomes necessary in order to lessen wow and flutter. In order to include this larger flywheel, the projector itself will be larger in size. Further, in order to avoid any mutilation of the film at the initiation of the device of the above-mentioned construction, a special mechanism other than the second sprocket has to be provided to actuate the flywheel on the initiation of the device.

In the new sound movie film system, the image projection position and the sound recording or reproducing position are not displaced far from each other. Therefore in the projector for such system there has been no ample space for the special mechanism of the above-mentioned impedance roller system. Accordingly, wow and flutter could not be avoided sufficiently and asynchronization of the image reproduction and sound reproduction at the initiation time has been experienced.

In order to avoid these drawbacks, it has been proposed that, other than the intermittent film advancing system, a separate drive mechanism be provided for the roller in order to feed the film continuously at the sound recording and/or reproducing head assembly.

However, with this system, a difference in the advancing speed at the projection stage and that at the sound recording and/or reproducing head is inevitable and after some time interval there occurs undesirable gather of the film at a special part. In order to avoid this and to maintain synchronization, some velocity control means becomes necessary. For example, it has been proposed to detect a signal from the film perforations at the sound recording and/or reproducing head position, and to control electro-magnetically the intermittent advance of the film in response to the signal detected. This system not only requires rather complicated construction of the device, but also provides undesirable noise, which then requires further means to shield the head assembly electro-magnetically so as not to pick up the noise.

There has also been proposed another method, wherein the difference between the film advancing velocity at the head assembly where the film is advanced continuously and the film advancing velocity at a projection gate for displaying the image, is detected with a feeler which lightly contacts the outer periphery of a loop of the film. Namely, the feeler detects the magnitude of the loop and changes its position in response thereto, with which it controls a transmission drive mechanism. According to this method, when the film is thin or when its stiffness differs, the loop form of the film changes even if the film length is the same and also the feeler is displaced according to the loop form. Thus correct detection cannot be made. In this case, since control of the motor speed is made by such means as switches in response to the movement of the feeler, the above-mentioned undesirable noise or instability still remains.

Further, in view that a large feeler biasing force cannot be used, a photoelectric type loop detecting device is proposed. In this case, however, according to its loop form, unstable operation occurs, and a special electrical circuit becomes further necessary.

It is possible to detect the feed speed difference between the projection gate and the sound recording and/or reproducing head assembly, as proposed in U.S. Pat. No. 3,743,398 to Johnson, et al. However, in this proposed system, there might occur undesirable effect from the detection member provided for this purpose on both or either of the intermittent film advancing mechanism and the sound head assembly.

It is an object of the present invention to provide a sound movie projector in which synchronization between image reproduction and sound reproduction is precisely made in a fully mechanical manner.

It is another object of the present invention to provide a sound movie projector in which the speed of the intermittent film advancing mechanism and that of the continuously advancing part are detected between a continuous film advancing roller and a second sprocket, the continuous film advancing roller being provided adjacent the sound recording and/or reproducing head assembly.

It is still another object of the present invention to provide a sound movie projector in which a tension lever is operatively associated with the film between the capstan roller and the second sprocket, and the difference in the film feeding speed is detected precisely by the displacement of the tension lever.

In accordance with the sound movie projector of the present invention, in order to feed the film with a uniform velocity, a relatively small flywheel is provided with a small roller (capstan), rotation of the constant speed motor is transmitted by a belt to drive the flywheel and the film is fed by being pressed between the capstan and a pinch roller. Thus the film is advanced only with the capstan roller provided with the flywheel to avoid any damage to the film fed. Since the device is thus provided with a simple construction, ample room for using new film of the new movie system can be provided. In short, the projector of the present invention is of simple construction and can synchronize automatically the manner between the image reproduction and sound recording and/or reproducing head in a specified relation.

The invention and its objects and advantages will become more apparent in the detailed description of the preferred embodiment, reference being made to the accompanying drawing.

The drawing shows a preferred embodiment of the film feed mechanism of the projector according to the present invention. The projector according to this embodiment is adapted to synchronize the film advancing speed by the sprockets, etc., with the film advancing speed by the capstan roller.

In the drawing, the numeral 1 is a driving motor, which rotates when energized at a constant speed. The rotation of the motor 1 is transmitted through a spiral gear 3 provided with a motor axle 2 to a spiral gear 4 engaged with the spiral gear 3, to rotate a small pulley 6 mounted on an axle 5 of the spiral gear 4. Around the pulley 6 and a flywheel 7 is disposed a belt 8. To the flywheel 7 a capstan or a small roller 9 is mounted integrally. A pinch roller 13 is pivotally mounted by an axle 12 to one end of a pinch roller arm 11 which is rotatably mounted to a projector-frame A and which is biased in the counterclockwise direction by a spring 10. The pinch roller 13 is adapted to contact the capstan 9 by the biasing force of the pinch roller arm 11 from the spring 10. Film F is advanced with constant speed between the contacting capstan 9 and the pinch roller 13.

On the other hand, at the right end of the motor axle 2 is provided a cone pulley 14. A follower cone pulley 15 is of relatively larger diameter than the cone pulley 14, the pulley 15 being fixed to an axle 17 rotatably mounted in the projector-frame. Around the cone pulleys 14 and 15 is disposed a flat belt 16 which can steplessly transmit the rotation of the motor axle 2, displacing its position in relation to the motor axle 2. To the axle 17 is further mounted an intermittently driven cam 20, which regulates the vertical movement of the film pull-down claw, not shown, a shutter blade 19 and a helical gear 18.

Engaged with the helical gear 18 is a helical gear 28 to which a chain sprocket 21 is mounted integrally.

A first sprocket 23 feeds the film F, during the forward mode operation of projection, led from a supply reel, not shown, to the film gate, and to the sprocket 23 is integrally mounted a chain sprocket 25.

A second sprocket 24 during the forward mode operation advances the film F to a winding reel, not shown, to which a chain sprocket 26 is mounted integrally. 39 is an idler chain sprocket.

Around the chain sprockets 25, 26, 21 and 39 is put a chain belt 27, and thus the film sprockets 23 and 24 are driven continuously according to the rotation of the chain sprocket gear 21 transmitted from the driving motor 1 through the motor axle 2, the cone pulley 14, the cone pulley 15, the axle 17 and the helical gear 18. Thus the film length between the two sprockets 23 and 24 is kept constant during projection of the image.

Along the film threading path between the first sprocket 23 and the second sprocket 24, there are provided serially an intermittent film advancing mechanism gate 29, a sound recording and/or reproducing head assembly 30, a film pad 36 and the capstan 9. 38 is a projection lamp to display the image and 37 is an objective.

A sensing lever 31 is pivotally mounted upon an axle 40 to the projector-frame A. To the sensing lever 31 is a rotative force in the counter-clockwise direction is given by a spring 33.

At the free end of the sensing lever 31 a sensing roller 32 is fixed, which contacts the film F between the capstan roller 9 and the second sprocket 24 and displaces the same accordingly. At the protruding part of the other end of the sensing lever 31 adjacent to the axle 40 is mounted a pin 34. The space between the pin 34 and the axle 40 comprises a shorter distance than that between the roller 32 and the axle 40.

A lever 35 is provided for transmitting the detected displacement of the sensing lever 31 to the belt 16. At one end of the lever 35 is provided a rectangular slot 35b to be engaged with the pin 34 on the sensing lever 31, and at the other end of the lever 35 a belt position regulating member 35a is provided whose width is slightly wider than that of the belt 16. The angular displacement appearing in the sensing lever 31 is transmitted to the belt 16 through the lever 35.

The projector of the present invention is as above constructed. In such projector, the distance from the center of the projection aperture to project the image, to the sound recording and/or reproducing head assembly is to be maintained strictly within a one frame difference from the specially determined value, such as 18 frames. Therefore, when the film F is introduced, as shown in the drawing, and then advanced, the length of the film F between the first sprocket 23 and the second sprocket 24 is constant since both sprockets 23 and 24 are driven with a single chain belt 27 as above described. If however this advancing speed by the two sprockets differs even slightly from the film speed advanced means of through the capstan roller 9 and the pinch roller 13, the film length between the film gate 29 and the capstan roller 9 becomes different. The sound head 30 is mounted very close to the capstan roller 9, and therefore in case that the film length between the head 30 and the capstan roller 9 is constant, some difference will appear between the image projected at the projection gate and the corresponding recording and/or reproducing of the sound.

As above mentioned, the film length between the image projected at the film projection gate and the sound recorded and/or reproduced must be 18 frames. If therefore the film advancing speed of the first and second sprockets 23 and 24, and the film advancing speed of the intermittent film advancing mechanism at the projection gate on a frame-by-frame basis driven both by the stepless transmission mechanism are slower than that of the capstan roller, the film length between the capstan roller 9 and the second sprocket 24 would be longer than normal condition. In such case, the sensing roller 32 of the sensing lever 31 is displaced to the position 32' shown in dotted line in the drawing and moves the film path from $F_2$ to $F_1$. According to the displacement of the roller 32, the pin 34 mounted on the other end of the sensing lever 31 rotates in the counterclockwise direction about axle 40 and accordingly moves the lever 35 to the right in the drawing. The flat belt 16 will also be moved toward the right. Due to the rightward displacement of the belt 16, the transmission rate of the stepless transmission mechanism becomes large and regulates the transmission speed of the first and second sprockets 23 and 24. More particularly, if the angular inclination of the cone pulleys is 5° and if the initial transmission rate between the two pulleys is 1, the 1mm displacement of the flat belt 16 would result in a rate of 1.02, or in other words a difference of 2 rotations per 100 rotations. (If the angular inclination is 6°, the difference would be 4 per 100 rotations.) To the axle of the follow cone pulley 15 is fixed the intermittent drive cam 20 and the shutter blade 19, and since the intermittent pull-down speed by the intermittent drive cam 20 for the standard projection of 8mm film is 18 frames per second, the 100 rotations of the blade 19 takes about 5.5 seconds. Therefore, the 1mm displacement of the belt 16 disposed around the pulleys of 5° inclination results in the change of 1 to 2 rotations of the intermittent advancing speed during 5.5 seconds.

Namely, if the film advancing speed of the film F between the sprockets 23 and 24 is slower than that between the capstan 9 and the pinch roller 13, the sensing roller 32 starts to displace its position and moves the lever 35 through the sensing lever 31. In this case, this sensing assembly acts as a position regulating means for the flat belt 16, enabling the acceleration of the speed of the rotation of the shutter blade 19 by the cone pulleys. The second sprocket 24 then rotates faster and the film length between the capstan roller 9 will be shorter, thus normal relations between the advancing speed of the two parts will be recovered.

As is clear from the above description, the sound movie projector according to this invention synchronizes the advancing speed using fully mechanical feedback, thus eliminating any switches, electrical elements, etc. Undesirable noises due to those means can be avoided. Further, the synchronization speed is higher than the projectors of the impedance roller system, because the projector according to this invention provides an independent continuous film drive system.

The invention has been described in detail with particular reference to an embodiment of the sound movie projector according to the present invention, but it will be understood that variations and modifications can be effected within the spirit and scope of the present invention.

What is claimed is:

1. A sound movie projector which comprises:
   (a) a first sprocket,
   (b) an intermittent film advancing mechanism for advancing the film on a frame-by-frame basis at a projection gate,
   (c) a sound recording and/or reproducing head assembly,
   (d) a film drive roller assembly,
   (e) a second sprocket,
   elements (a) (b) (c) (d) (e) being disposed serially along a film threading path defined between the two sprockets,
   (f) a pivotally mounted sensing lever, for measuring film length, operatively engaged with said film at a position interposed between the film drive roller assembly and the second sprocket, said film interposed between said film drive roller assembly and said second sprocket normally having a substantially rectilinear configuration,
   (g) a driving motor,
   (h) a stepless transmission mechanism, composed of two cone pulleys and a belt disposed therearound, for transmitting the rotation of the driving motor,
   (i) a first drive mechanism which drives, by means of the output of the stepless transmission mechanism, the first sprocket, the intermittent film advancing mechanism, and the second sprocket,
   (j) a second drive mechanism which transmits rotation of the driving motor to the film drive roller assembly, and
   (k) a displacing mechanism for displacing the position of the belt in response to displacement of the pivotally mounted sensing lever.

2. A sound movie projector according to claim 1, wherein the pivotally mounted sensing lever is biased in one direction by a spring and is adapted to displace its position angularly according to the film length between the film drive roller assembly and the second sprocket.

3. A sound movie projector according to claim 2, wherein on one end of the pivotally mounted sensing lever a small-sized roller is provided which rotates in response to the threading of the film.

4. A sound movie projector according to claim 3, wherein on the pivotally mounted sensing lever there is provided a transmitting pin which is spaced apart from the pivot axis of the sensing lever a shorter distance than that distance between the small-sized roller and the pivot axis.

5. A sound movie projector according to claim 4, wherein a displacement transmission member, of the displacing mechanism, is a lever which is engaged at its one end with the transmitting pin provided on the sensing lever and is adapted at the opposite end thereof not to interfere with the advancing movement of the belt but to restrict the movement thereof transversely.

6. A sound movie projector according to claim 1, wherein the film drive roller assembly comprises a capstan roller and a pinch roller which biases the film toward the capstan roller and rotates therewith.

7. A sound movie projector according to claim 1, wherein the second drive mechanism includes a pulley engaged at one end of a gear train connected with a motor axle of the driving motor, a flywheel provided coaxially with the capstan roller of the film drive roller assembly, and a belt disposed around the pulley and the flywheel.

8. A sound movie projector according to claim 1, wherein the first drive mechanism having a chain belt provides a constant relation between the first sprocket, the intermittent film advancing mechanism and the second sprocket.

9. A sound movie projector according to claim 1, wherein the sound recording and/or reproducing head assembly includes a film pressure plate.

* * * * *